United States Patent [19]
Murata

[11] Patent Number: 6,088,741
[45] Date of Patent: Jul. 11, 2000

[54] STORAGE MEDIUM SYSTEM WHICH USES A CONTACTLESS MEMORY CARD

[75] Inventor: Mitsuhiro Murata, Saitama, Japan

[73] Assignee: Citizen Watch Co., Ltd., Tokyo, Japan

[21] Appl. No.: 08/981,785

[22] PCT Filed: May 9, 1997

[86] PCT No.: PCT/JP97/01567

§ 371 Date: Mar. 9, 1998

§ 102(e) Date: Mar. 9, 1998

[87] PCT Pub. No.: WO97/42597

PCT Pub. Date: Nov. 13, 1997

[30] Foreign Application Priority Data

| | | | |
|---|---|---|---|
| May 9, 1996 | [JP] | Japan | 96-114508 |
| Jun. 7, 1996 | [JP] | Japan | 96-145844 |

[51] Int. Cl.[7] ............................................. G06F 13/14
[52] U.S. Cl. .................. 710/20; 710/129; 711/115; 711/170
[58] Field of Search .................... 711/115, 170; 340/10.3, 10.51; 235/449; 600/508, 509; 375/279; 710/20, 129

[56] References Cited

U.S. PATENT DOCUMENTS

| | | | |
|---|---|---|---|
| 5,198,647 | 3/1993 | Mizuta | 235/449 |
| 5,594,680 | 1/1997 | Ohtake et al. | |
| 5,703,573 | 12/1997 | Fujimoto et al. | 340/10.3 |
| 5,862,803 | 1/1999 | Resson et al. | 600/508 |
| 5,929,778 | 7/1999 | Asama et al. | 340/10.51 |
| 5,949,826 | 9/1999 | Iiyama et al. | 375/279 |
| 5,957,854 | 9/1999 | Besson et al. | 600/509 |

FOREIGN PATENT DOCUMENTS

| | | |
|---|---|---|
| 62-122439A | 6/1987 | Japan . |
| 1-126785A | 5/1989 | Japan . |
| 3-191492A | 8/1991 | Japan . |
| 7-271928A | 10/1995 | Japan . |

*Primary Examiner*—Thomas C. Lee
*Assistant Examiner*—Fred F. Tzeng

[57] ABSTRACT

In a contactless memory card system, a means is provided for sending a transmission wait request signal to the memory card when yet-to-be-passed received data remains in both the serial data receiving circuit and received data buffer via an electromagnetic coupling interface section, thereby preventing overrun errors even when the reading by a microcomputer of reader/writer received data is slow.

13 Claims, 9 Drawing Sheets

STORAGE MEDIUM SYSTEM WHICH USES A CONTACTLESS MEMORY CARD

This application is the national phase under 35 U.S.C. §371 of prior PCT International Application No. PCT/JP97/01567 which has an International filing date of May 9, 1997 which designated the United States of America, the entire contents of which are hereby incorporated by reference.

BACKGROUND OF THE INVENTION

1. Field of the Invention

The present invention relates to a non-contact memory card system that is configured so as to perform sending and receiving of data by means of electromagnetic coupling (known also as electromagnetic induction), and more specifically to a storage medium system that uses a contactless memory card which is configured so as to perform sending and receiving of data by means of electromagnetic coupling (known also as electromagnetic induction) via an LC resonant circuit.

2. Description of Related Art

In recent years, work on achieving practically usable contactless memory cards for as a small, highly reliable storage medium has progressed, resulting in an expanded range of applications thereof, as well as a significant increase in their storage capacity.

Along with the achievement of large storage capacity, there is a naturally occurring need to transfer data at high speed.

In general, however, it is extremely difficult to increase the speed of data transmission when performing transmission using an electromagnetic coupling via an LC resonant circuit.

Methods of increasing the transmission speed which can be envisioned include such methods as (1) simply decreasing the amount of time required to send each bit, (2) providing a plurality of LC resonant circuits so as to send data in parallel, and (3) employing multiphase modulation so as to send a plurality of data bits simultaneously.

The last method (3) requires a plurality of modulator and demodulator circuits for multiphase PSK or multiphase FSK, making its employment particularly difficult in the field of contactless memory card systems, in which there is a strong demand for compact, lowcost readers and writers.

A known storage medium system that makes use of such a contactless memory card, such as that shown in FIG. 8, has a reader/writer-side electromagnetic coupling interface section 1 and a memory card side electromagnetic coupling interface section 10.

FIG. 8 is the circuit diagram of the communication circuit of a contactless memory card system of the past, and FIG. 9 is a drawing that shows the main waveforms in therein.

In a storage medium system which uses the contactless memory card of the past as shown in FIG. 8, a printed coil type antenna 2 of the reader/writer-side electromagnetic coupling interface 1 and a printed coil type antenna 12 of the LC resonant circuit 11 of the memory card side electromagnetic coupling interface 10 are in opposition to one another when access is performed, bringing these elements into electromagnetic coupling condition so that data can be passed therebetween.

That is, the antennas 2 and 12 on the reader/writer side and card side, respectively, are both used for both sending and receiving.

If the start-stop synchronized serially transmitted data BD having a bit time width (time length of 1 bit) of tb shown in FIG. 9 is sent by the card side to the reader/writer side, corresponding to the time when the transmitted data BD is 0, at the transmitted signal forming circuit 15, a transmitted signal TX is formed by a single-shot signal, this signal driving the transmitting driving transistor 13.

That is, each time the above-noted transmitted data DB is 0, the resonant circuit 11 is single-shot driven, resulting in electromagnetic induction in the antenna 2 of the reader/writer-side electromagnetic coupling interface section 1.

When this occurs, although the drive is single-shot, because of the resonating phenomenon in the resonant circuit 11, the current waveform in the antenna 12 is a freely damped waveform, the induced waveform in the antenna 2 of the reader/writer-side interface section 1 also exhibiting a similar freely damped waveform shape.

The above-noted induced waveform occurring in the antenna 2 is input to the receiving demodulation circuit 3 at which it is demodulated, the DC component being first cut from and bias being applied to this signal by means of capacitor C1 and resistors R1 and R2, thereby becoming the input signal WP which is then input to a window comparator 6 (this being the signal with respect to which receiving demodulation is performed).

Therefore, while the waveform of the input signal WP is approximately similar to the waveforms (not shown in the drawing) that appear in the antennas 12 and 2, if this input signal WP exceeds the limits of a window W that is established by the resistors R3, R4, and R5, the receiving demodulated signal RD that is the output of the window comparator 6 is made 0.

If this receiving demodulated signal RD is at the 0 level for even one instant during a prescribed sampling period tc which has as its relative phase reference point the detected point TR0 of the start bit thereof, at the received data processing circuit within the reader/writer, the received data during this period is treated as 0.

If the start-stop synchronized serially transmitted data TD is transmitted from the reader/writer side to the card side, when the transmitted data TD bit data is 0, a transmission carrier TC of a prescribed frequency is input to the transmission driving circuit 5 via the transmission modulator circuit 4.

That is, the transmission modulator circuit 4 performs inverted ASK modulation (in which the carrier signal is output when the transmitted data is 0) of the transmission carrier signal TC in accordance with the transmitted data signal TD, and during the period in which the transmitted data TD is 0, the series resonant circuit formed by capacitor C2 and the antenna 2 of the transmitting driving circuit 5 is driven, the resonant waveform RS appearing as a result of induction therefrom in the card-side resonant circuit 11.

Because this resonant waveform RS is input to the detector circuit 14 at which it is detected, when the antenna 2 is driven by the transmission carrier signal TC, the received data RX output from the detector circuit 14 is basically also 0.

Each prescribed sampling timing TSP of the received data RX, which is established using the start bit detection point TS0 thereof as a phase reference, serial received data is captured, one bit at a time.

As described above, in a contactless memory card system of the past, as shown in FIG. 8 and FIG. 9, receiving at the card side is performed via an LC resonant circuit, this being effective in simplifying the receiving circuit at the card side so as to enable the reception of a maximum amplitude signal with respect to the signal transmitted from the reader/writer.

Additionally, because noise at frequencies other than the resonant frequency of the LC resonant circuit is not easily accepted, this has the advantage of suppressing communication errors caused by noise from outside the system.

When transmitting from the card side, using a transmitted signal that is formed by a single-shot signal so as to drive the above-noted resonant circuit for transmitting is effective in minimizing the amount of electrical power required when transmitting from the card.

However, in spite of the above advantages, because of the characteristic free damping in the above-noted resonant circuit, the phenomenon of the lingering of the transmitted signal presents problems in terms of both communication reliability and improving the speed of transmission.

Specifically, in the case in which transmission drive is done by a single-shot transmitted signal, because of the free damping in the resonant circuit, there is not sufficient reduction in the amplitude thereof during the bit time width tb of the serial transmitted data BD, this resulting in the risk of causing a receiving error at the reader/writer side.

For example, as shown in FIG. 9, if we assume the case in which a the time TS the bit data is 0 and the transmitted signal is output, and in which at the time TE the bit data becomes 1 and the transmitted signal is not output, if the amplitude when the sampling period tc is reached with respect to the time TE, because of the lingering freely damped signal in the resonant circuit (this being referred to as reverberation hereinafter), still exceeds the window, a communication error will occur at this point.

In a communication circuit of such a contactless memory card of the past as described above, because of reverberation in the LC resonant circuit, there is a loss of communication reliability, and in order to improve the communication reliability it is necessary to reduce the communication speed so that the bit period is long, so that the communication period for a bit is started only after the reverberation of the previous bit has sufficiently settled.

If the drive power at the transmitting side is merely increased to make the communication waveform amplitude large, the reverberation amplitude also becomes large, so that this is clearly not a solution to the problem of reliability margin or improvement of transmission speed.

As described above, in the prior art there was a limit to increasing the communication speed without sacrificing communication reliability, and if it were possible to achieve high-speed communication, this would lead to the microprocessor that controls the reader/writer for card access not being able to keep up to the operating speed, or losing received data or experiencing overrun errors while it was processing emergency interrupts.

That is, in a contactless memory card system, because the number of communication transmission paths between a card and a reader/writer is limited to the minimum because of limitations such as those on space, it is extremely inappropriate to provide, as is done in communications relying on direct connections, a dedicated signal line for handshaking, this being used to make the other device wait for transmission.

As a result, in a contactless memory card system of the past, there was a need to enable the host system microcomputer to successively read in data via a reader/writer without overrun errors when the card side first starts sending data read from memory.

Therefore, although card reader/writers use a variety of microcomputer types, depending upon the application system, some of these microcomputer types have slow operating speed, and when use with such slow microcomputers is considered, it ultimately becomes impossible to increase the speed of transmission between a contactless memory card and the reader/writer.

Depending upon the application, during receipt of a transmission from the card, there is a possibility of receiving an interrupt having a higher priority, and in this case if the next data is received before the microcomputer captures data received by the reader/writer, an overrun error occurs.

An object of the present invention is to provide a contactless memory card system having a contactless memory card and a card reader/writer that perform mutual passing of data therebetween via an electromagnetic coupling interface section that includes a coil that serves for both transmitting and receiving, this system overcoming the above-noted problems associated with the prior art, so that it is possible to increase the speed without causing overrun errors even when connected to a microcomputer having a slow operating speed, if the microcomputer side performs processing of an interrupt, leading to the possibility that the capture of data from the reader/writer will not be done on time.

A further object of the present invention is to provide a contactless memory card configured so as to perform data transmission by an electromagnetic coupling via an LC resonant circuit, this solving the above-noted problem associated with the prior art attributed to reverberation in the above-noted resonant circuit, enabling an increase in the communication speed without sacrificing communication reliability.

SUMMARY OF THE INVENTION

To achieve the above-noted objects, a storage medium system which uses a contactless memory card according to the present invention has the following basic technical configuration.

Specifically, the first aspect of a storage medium system which uses a contactless memory card according to the present invention is a storage medium system that uses a contactless memory card and a card reader/writer that perform the transfer of information that is start-stop synchronized serial data via an electromagnetic coupling interface section which include respective coils that serve for both transmitting and receiving, the above-noted reader/writer side being provided with a data receiving circuit that receives the above-noted data (start-stop synchronized serial data) sent from the memory card side via the above-noted electromagnetic coupling interface section and converts this to parallel data, a received data buffer that stores already-received parallel data that had been passed by the above-noted data receiving circuit, a receiving control circuit which, in the condition in which there is already-received data remaining in both the above-noted data receiving circuit and the above-noted received data buffer, outputs a transmission wait request signal to the memory card, and a transmitting modulation circuit which receives the above-noted transmission wait request signal and controls the above-noted electromagnetic coupling interface section so as to be in a prescribed transmission modulation condition.

Additionally, the second aspect of a storage medium system which uses a contactless memory card according to the present invention is a storage medium system that uses a contactless memory card and a card reader/writer that perform the transfer of information that is start-stop synchronized serial data via an electromagnetic coupling interface section which include respective coils that serve for both transmitting and receiving, the above-noted memory card side being provided with a data transmitting circuit that send start-stop synchronized serial data to the reader/writer via the above-noted electromagnetic coupling interface section, a means for detecting, during an interval between each transmission of the above-noted start-stop synchronized serial data, the presence or lack of a transmission wait request signal sent from the reader/writer side, and a transmitting control circuit which, when the above-noted detecting means detects the above-noted transmission wait request signal, causes the above-noted data transmitting circuit to wait before transmitting the next data, at least until this transmission wait request signal is cleared.

Additionally, a third aspect of a storage medium system which uses a contactless memory card according to the present invention is a storage medium system that uses a contactless memory card and a card reader/writer that perform the transfer of information that is start-stop synchronized serial data via an electromagnetic coupling interface section which includes respective coils that serve for both transmitting and receiving, the above-noted reader/writer side being provided with a data receiving circuit that receives the above-noted data (start-stop synchronized serial data) sent from the memory card side via the above-noted electromagnetic coupling interface section and converts this to parallel data, a received data buffer which stores already-received parallel data that has been passed by the above-noted data receiving circuit, a receiving control circuit which, in the condition in which there is already-received data that has yet to be passed remaining in both the above-noted data receiving circuit and the above-noted received data buffer, outputs a transmission wait request signal to the memory card, and a transmission modulation circuit which receives the above-noted transmission wait request signal and controls the above-noted electromagnetic coupling section as to be in a prescribed transmission modulation condition, and the above-noted memory card side being provided with a data transmitting circuit that transmits start-start synchronized serial data via the electromagnetic coupling interface section in prescribed bit units, a means for detecting during an interval between each transmission of the above-noted start-stop synchronized serial data, the presence or lack of a transmission wait request signal sent from the reader/writer, and a transmitting control circuit which, when the above-noted detecting means detects the above-noted transmission wait request signal, causes the above-noted data transmitting circuit to wait before transmitting the next data, at least until this transmission wait signal is cleared.

The fourth aspect of a storage medium system which uses a contactless memory card according to the present invention is a contactless memory card system which uses a contactless memory card and a card reader/writer that perform the transfer of information that is start-stop synchronized serial data via an electromagnetic coupling interface section which includes respective coils that serve both for transmitting and receiving, the antenna of the electromagnetic coupling interface section of the above-noted memory card side being an LC resonant circuit, and this memory card side being also provided with a transmitted signal forming circuit which forms a transmitted signal by means of a single-shot signal in response to the contents of the data to be transmitted, a transmission driving circuit which drives the above-noted LC resonant circuit in response to this transmitted signal, a resonance control circuit which is connected in parallel with the LC resonant circuit, and a control signal forming circuit which forms a control signal having a prescribed phase relationship with respect to the timing of the output of the transmitted signal, this control signal controlling a switching element that is part of the above-noted resonance control circuit so as to promote attenuation of the oscillation in this LC resonant circuit.

The prescribed bit unit used in the present invention is not limited to 8 bits, and can be, for example, 16 bits (1 word) as one unit.

DETAILED DESCRIPTION OF THE PREFERRED EMBODIMENTS

A specific embodiment of a storage medium system that uses a contactless memory card according to the present invention is described below, with reference being made to the relevant accompanying drawings FIG. 1 through FIG. 7.

Figure 1:
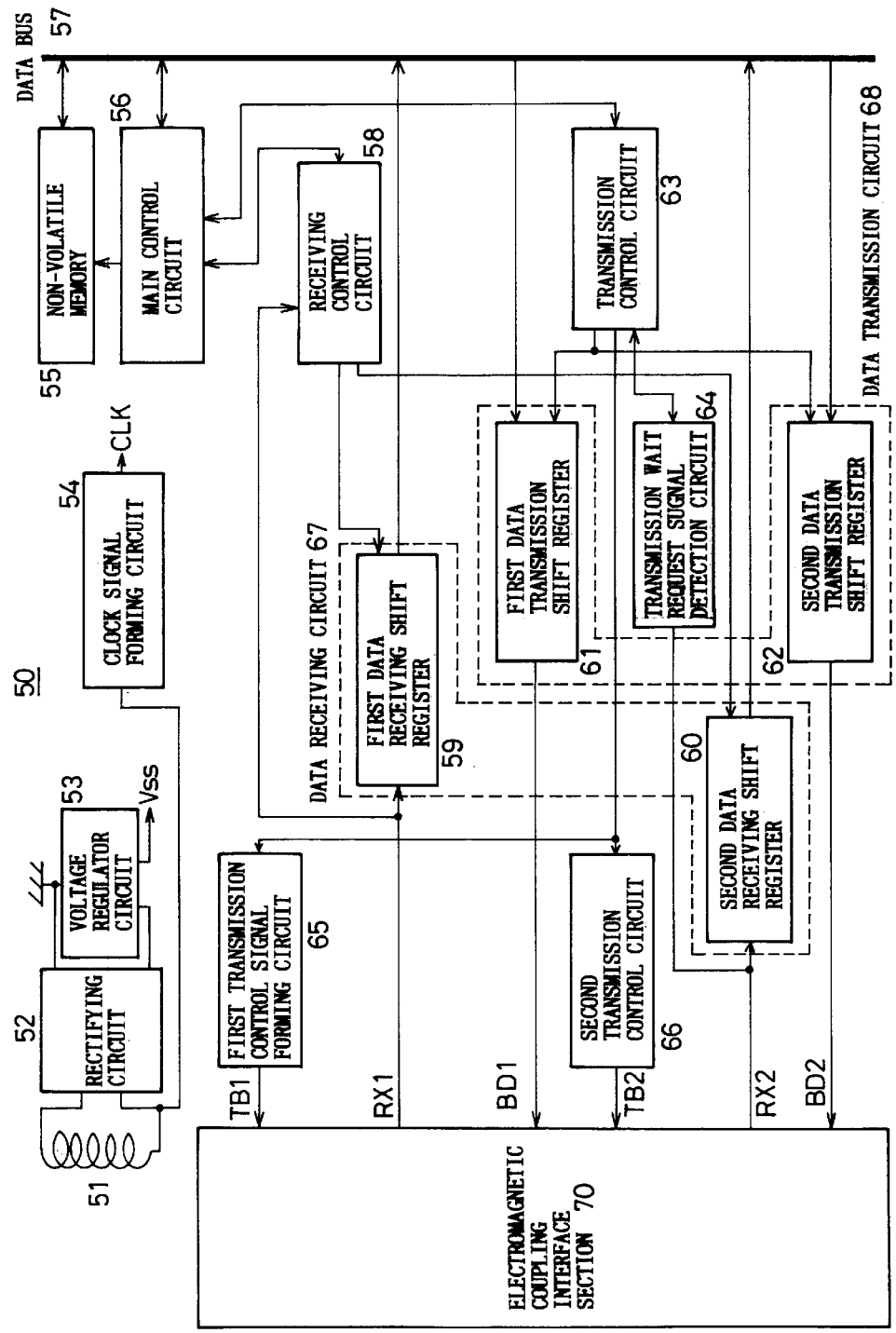
FIG. 1 is a block diagram which shows the configuration of an embodiment of a contactless memory card according to the present invention.
Figure 2:
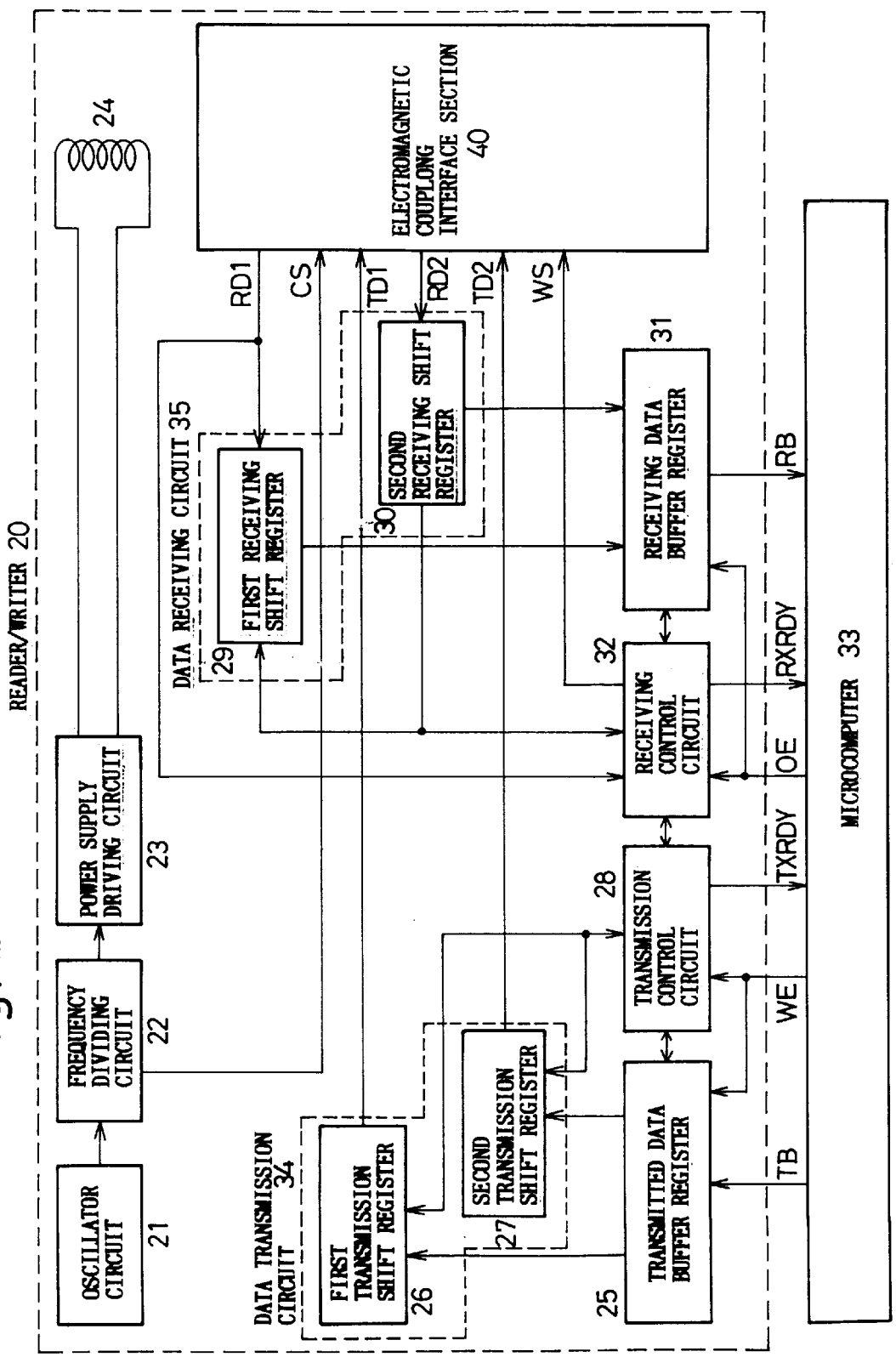
FIG. 2 is a block diagram which shows the configuration of a reader/writer according to an embodiment of the present invention.
Figure 3:
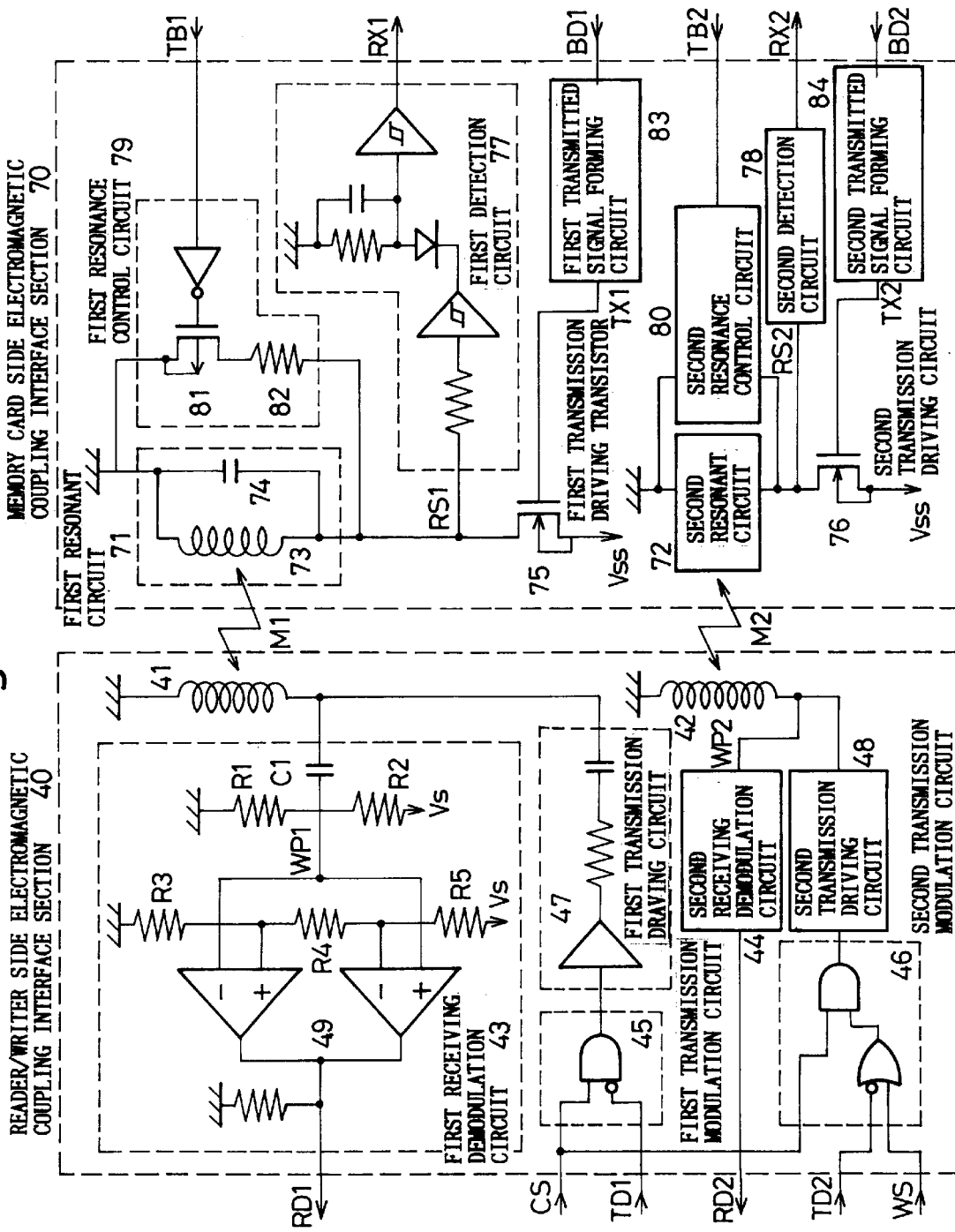
FIG. 3 is a circuit diagram which shows the configuration of the communication circuit in a storage medium system which uses a contactless memory card according to an embodiment of the present invention.

Specifically, FIG. 1 through FIG. 3 show a specific example of a storage medium system which uses a contactless memory card according to the present invention, this system being formed by a contactless memory card 50 and a card reader/writer 20 that perform mutual start-stop synchronized data transfer via the electromagnetic coupling interface sections 40 and 70, which include a combination transmitting/receiving coil.

The above-noted reader/writer 20 shown in FIG. 2 has a data receiving circuit 35, which receives data that is send from the memory card 50 via the above-noted electromagnetic coupling interface sections 40 and 70, a received data buffer 31 that converts to parallel data and stores the serial data already received in 1-byte units from the data receiving circuit 35, and a receiving control circuit 32 which, in the condition in which there is already-received data remaining in both the above-noted data receiving circuit 35 and the above-noted received data buffer 31, outputs a transmission wait request signal WS to the memory card 50.

The following is a more detailed description of the configuration and operation of a storage medium system that uses the above-noted contactless memory card according to the present invention.

Specifically, in this storage medium system which uses the contactless memory card according to the present invention, the reader/writer 20 has a data receiving circuit 35 which receives start-stop synchronized serial data sent from the memory card 50 via the electromagnetic coupling interface section 40, a received data buffer 31 that receives parallel data that has already been received in 1-byte units from the above-noted data receiving circuit 35, a receiving control circuit 32 which, in the condition in which there is already received data in both the data receiving circuit 35 and the received data buffer 31, outputs a transmission wait request signal WS to the memory card side, and a transmission modulator circuit 46 which receives the above-noted transmission wait request signal WS and controls the electromagnetic coupling interface section 40 so as to place it in a prescribed transmission modulation condition.

The above-noted memory card side 50, shown in FIG. 3, has a data transmitting circuit 68 which transmits start-stop synchronized serial data in 1-byte units via the electromagnetic coupling interface section 70, a transmission wait request signal detection circuit 64 which detects the presence or lack of a transmission wait request signal WS send from the reader/writer side 20 via the electromagnetic coupling interface sections 40 and 70 during an interval between each transmission of said start-stop synchronized series data and a transmission control circuit 63 which once when the presence of this transmission wait request signal WS is detected by the above-noted detection circuit 64, causes the data transmitting circuit 68 to wait to transmit the next 1-byte of data, at least until this transmission wait request signal WS is cleared.

FIG. 1 through FIG. 7 show a contactless memory card system that is an embodiment of the present invention. FIG. 1 and FIG. 2 are simplified block diagrams of the contactless memory card and reader/writer, respectively, FIG. 3 is a circuit diagram which shows communication circuit for the electromagnetic coupling interface sections between the reader/writer and the contactless memory card.

FIG. 4 through FIG. 7 are waveform diagrams of the main communication waveforms. Because the reader/writer 20 which is shown in FIG. 2 is generally built within a microcomputer system, this embodiment is also configured so that passing of received and transmitted data is performed in 1-byte units with respect to the microcomputer 33.

As shown in FIG. 2, in the reader/writer 20, the output of the oscillator circuit 21 is divided by the frequency dividing circuit 22 down to the power supply carrier frequency, after which it is input to a push-pull configured power supply driving circuit 23, so as to series resonance drive the power supply printed coil type antenna 24.

As shown in FIG. 1, the printed coil type antenna 51 for the purpose of receiving power on the memory card 50 side and which is configured so as to be in opposition to the antenna 24 when performing access, is connected to a rectifying circuit 52 and a clock signal forming circuit 54, the rectified power supply provided by the rectifying circuit 52 being regulated by a voltage regulator circuit 53 and supplied as the VSS power supply to various circuits within the memory card 50.

The clock signal CLK that is regenerated as a signal of the above-noted power supply carrier frequency at the clock signal forming circuit 54 also is supplied to various circuits within the memory card 50.

Another specific example of a storage medium system that uses a contactless memory card according to the present invention is a storage medium system that uses the above-noted contactless memory card, in which the memory card side 50 is provided with a data transmitting circuit 68 which sends serial data in 1-byte units via the electromagnetic coupling interface section 70 and a transmission wait request signal detection circuit 64 which, during an interval between each transmission of the serial data in 1-byte units, for each interval between this transmission, detects the presence or absence of a transmission wait request signal WS being sent from the reader/writer 20 via the electromagnetic coupling interface sections 40 and 70.

The configuration of another example of the present invention, as shown in FIG. 3, has a communication circuit of the contactless memory card system which has two sets of electromagnetic coupling interface sections, wherein at the reader/writer side electromagnetic coupling interface section 40 are provided the printed coil type first communication antenna 41 and second communication antenna 42.

The parallel LC type resonant circuit 71 provided in an transmission circuit of the contactless memory card 50 is formed by a printed coil type communication antenna 73 and a capacitor 74, this antenna 73 being brought into proximity with and opposite to the first communication antenna 41 of the reader/writer side 20 electromagnetic coupling interface section 40 when performing access.

The second resonant circuit 72 of the memory card side 50 has the same configuration as the first resonant circuit 71, the relationship of this antenna (not shown in the drawing) to the communication printed coil 42 within the electromagnetic coupling interface section 40 of the reader/writer side also being exactly the same.

That is, in the above-noted example of the present invention, there can be either one electromagnetic coupling interface section in the reader/writer 20 and the contactless memory card 50 and there can be two or more such electromagnetic coupling interface sections that are independent.

Additionally, in the above-noted example of the present invention, it is preferable that the reader/writer 20, have a transmission modulator circuit 46 such as shown for example in FIG. 3, that, in response to a transmission wait request signal WS, controls the electromagnetic coupling interface section, so as to place it in a prescribed transmission modulation condition.

For example, during the period in which the transmission wait request signal WS is being output, this transmission modulator circuit 46 causes the output of the carrier signal CS to the electromagnetic coupling interface section 40.

In the above-noted example of the present invention, it is also desirable that the memory card side 50 be provided with a transmission wait request signal detection circuit 64 and a transmission control circuit 63, so that when the transmission wait request signal is detected by this transmission wait request signal detection circuit 64, the data transmitting circuit 68 is caused by the transmission control circuit 63 to wait before sending the next 1-byte of data, at least until the transmission wait request signal is cleared.

The basic communication operation between the reader/writer 20 and the memory card 50 in a storage medium system which uses the contactless memory card of the present invention will be described below, with reference being made to FIG. 1 through FIG. 4.

Specifically, the communication between the reader/writer side 20 and the memory card side 50, in both directions therebetween, is performed by sending and receiving one byte at a time, a block of data consisting of a plurality of bytes, formatted with odd parity, 2 stop bits, and with the LSB send first.

Figure 4:
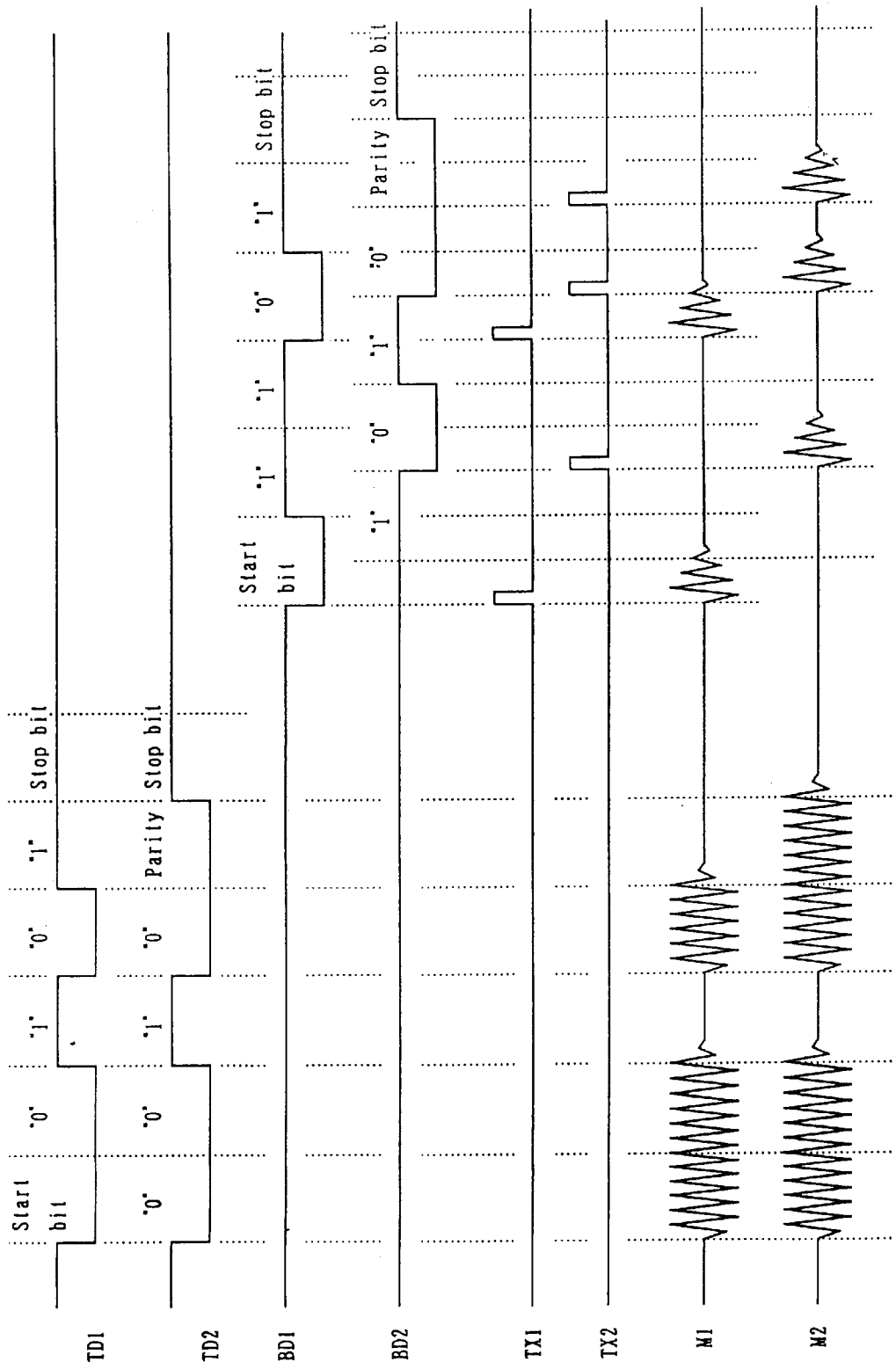
FIG. 4 is a waveform diagram which shows the main communication waveforms in an embodiment of the present invention.

In FIG. 4, after sending the last 1-byte data (4ah in hexadecimal) from the reader/writer side 20 to the memory card side 50, the first block of the return block data (5Bh in hexadecimal) is sent from the memory card side 50 to the reader/writer side 20.

That is, in FIG. 4, the condition shown is that in which there is switching between sending and receiving between the reader/writer side 20 and the memory card side 50.

First, the transmission of data from the reader/writer 20 to the memory card 50 will be described.

Each 1 byte of transmitted data TB from the microcomputer 33, is first passed to the transmitted data buffer register 25, and if the first and second transmission shift registers 26 and 27 that form the transmission circuit 34 are at this point still performing transmission of the previous data, the data is held as is in the transmission data buffer 25 until the transmission is ended and the first and second transmission shift registers 26 and 27 are empty.

If the first and second transmission shift registers 26 and 27 are empty, one byte of data to be transmitted from within the transmission data buffer register 25 is divided into a lower-order 4 bits and an upper-order 4 bits, each of these being set into the first and second transmission shift registers 26 and 27, respectively, at which these are converted from parallel to serial data, these being input as the serial transmission data TD1 and TD2 to the first and second transmission modulator circuits 45 and 46 as shown in FIG. 3.

When the transmission buffer register 25 as noted above finishes the passing of transmission data to the first and second transmission shift registers 26 and 27, the transmission control circuit 28 sets the signal TXRDY, indicating to the microcomputer 33 that it is possible to receive new transmission data.

That is, in response to the write enable signal WE from the microcomputer 33, this is the condition in which it is possible to write new transmission data TB into the transmission buffer register 25.

The above-noted serial transmission data TD1 and TD2 are transmitted by start-stop synchronized transmission and, as shown in FIG. 4, a start bit is attached to the front of the serial transmission data TD1 only, while a vertical parity bit being attached to the serial transmission data TD2 only, so that when these are included the configuration is that of 5-bit serial data with a stop bit attached.

When transmitting from the reader/writer side 20, because the transmission wait request signal WS, to be described later, with respect to the memory card side 50 is maintained in the 0 condition, only when the serial transmission data TD1 and TD2 bit data is 0 is the transmitting carrier signal CS of the prescribed frequency input respectively to the first and second transmission driving circuits 47 and 48, via the first and second transmission modulator circuits 45 and 46, respectively.

That is, the first and second transmission modulator circuits 45 and 46 modulate the transmission carrier signal CS with the serial transmission data TD1 and TD2 using the so-called inverted ASK modulation, the result of which is that, during the period in which the serial transmission data TD1 and TD2 are 0, the first and second communication antennas 41 and 22 at the reader/writer 20 side are in the transmission modulated condition by means of serial resonance drive, and the resonant signal appears also at the first and second resonant circuits 71 and 72 at the memory card 50 side as well.

That is, the first and second electromagnetic coupling interface signals M1 and M2 shown in FIG. 4 are the waveforms which indicate the AC magnetic field in the electromagnetic coupling interface section between the memory card side 50 and the reader/writer side 20, and when a current change occurs at one of the antennas of the memory card 50 side and of the reader/writer 20, the resulting AC magnetic field that is generated induces a current change in the other antenna, the result being that signal waveforms approximately similar to the waveforms of the first and second electromagnetic coupling interface signals M1 and M2 appear at both the memory card 50 side and the reader/writer 20 side.

The above-noted resonance waveforms that is induced in the first and second resonant circuits 71 and 72 on the memory card 50 side, as shown in FIG. 3, are input to the first and second detection circuits 77 and 78, so that basically when the first and second communication antennas 41 and 42 are driver by the above-noted transmission carrier signal CS, the receiving modulation signals RX1 and RX2 that are output from the detection circuits 77 and 78 are in the 0 condition.

The receiving modulation signals RX1 and RX2, based on a timing function included in the receiving control circuit 58 which is shown in FIG. 1, are input one bit at a time to the first and second data receiving shift registers 59 and 60, each prescribed sampling timing, which uses the point at which the start bit of the receiving modulation signal RX1 is detected as a phase reference point.

Next, the transmission of data from the memory card 50 side to the reader/writer 20 will be described.

The memory card 50 in this example of the present invention includes an internal non-volatile EEP-ROM memory 55 so that, for example, in response to a control signal from the main control circuit 56, one byte of data read out from the non-volatile memory 55 is divided into a lower-order 4 bits and an upper-order 4 bits, these being stored via a data bus 57 in the first and second data transmission shift registers 61 and 62 provided as a data transmission circuit for the purpose of parallel-to-serial conversion.

As a result, in response to the transmission timing signal and the like from the transmission control circuit 63, from the first shift register 61 the lower-order 4 bits of the one byte of data are output as the first serial transmission data BD1 in start-stop synchronization fashion, and in the same manner the upper-order 4 bits of the one byte of data are output as the second serial transmission data BD2.

Additionally, the first and second transmission signal forming circuits 83 and 84, in response to the above-noted first and second transmission data BD1 and BD2, form the transmission data signals TX1 and TX2 by means of a single-shot signal.

When doing this, when each bit data BD1 and BD2 is 0, the corresponding transmission signals TX1 and TX2 are formed using a single-shot signal, these driving the first and second transmission driving transistors 75 and 76, respectively, within the electromagnetic coupling interface section 70 on the contactless memory card 50 side.

That is, each time the above-noted transmission data BD1 and BD2 become 0, the first and second resonant circuits 71 and 72 are single-shot driven, the result of which is that there is a current change caused by electromagnetic induction in the first and second antennas 41 and 42 also on the reader/writer side electromagnetic coupling interface section 40.

When this occurs, while the drive is single-shot drive, because of the resonance phenomenon in the resonant circuits 71 and 72, the waveforms of the electromagnetic interface signals M1 and M2, respectively, are freely damped waveforms that are approximately mutually similar.

The signal waveform that is generated by induction within the reader/writer 20 at the antenna 41 is input to the receiving demodulator circuit 43 at which it is demodulated by first having the DC component thereof blocked and a bias applied thereto by the capacitor C1 and the resistors R1 and R2, the resulting WP input signal being applied to the window comparator 49 (this being the received signal that is actually the object of the demodulation process).

Thus, while the input waveform WP is also approximately similar to the electromagnetic interface signal M1, if this input signal WP exceeds a window width W that is established by the resistors R3, R4, and R5, the first received demodulated signal RD1 which is the output of the window comparator 49 is set to the 0 level.

The action of the second antenna 42, receiving demodulator circuit 44, and received demodulated signal RD2 is exactly the same as the above-described case of the first antenna 41, receiving demodulator circuit 43, and received demodulated signal RD1.

The above-noted received demodulated signals RD1 and RD2 are input respectively to the first and second receiving shift register 29 and 30, which are provided as the data receiving circuit 35 at the reader/writer 20 side, and each time the receiving of the lower-order 4 bits and an upper-order 4 bits of one byte of received data is completed, this is passed as one byte of parallel received data to the receiving buffer register 31.

When one byte of data is passed to the receiving shift register 31 as describe above, a signal RXRDY, which indicates that it is possible to read in received data, is output from the receiving control circuit 32, and in response to an output enable signal OE from the microcomputer 33, it is possible to read one byte of received data RB.

Because the data receiving at the reader/writer 20 side is basically single-shot reception, if the first and second received demodulated signals RD1 and RD2 are at the 0 level for even an instant during a prescribed sampling period that has as its phase reference point the point at which the stop bits, respectively, thereof are detected, when reading these into the first and second receiving shift registers 29 and 30, the received bits during this period are treated as being 0.

Figure 5:
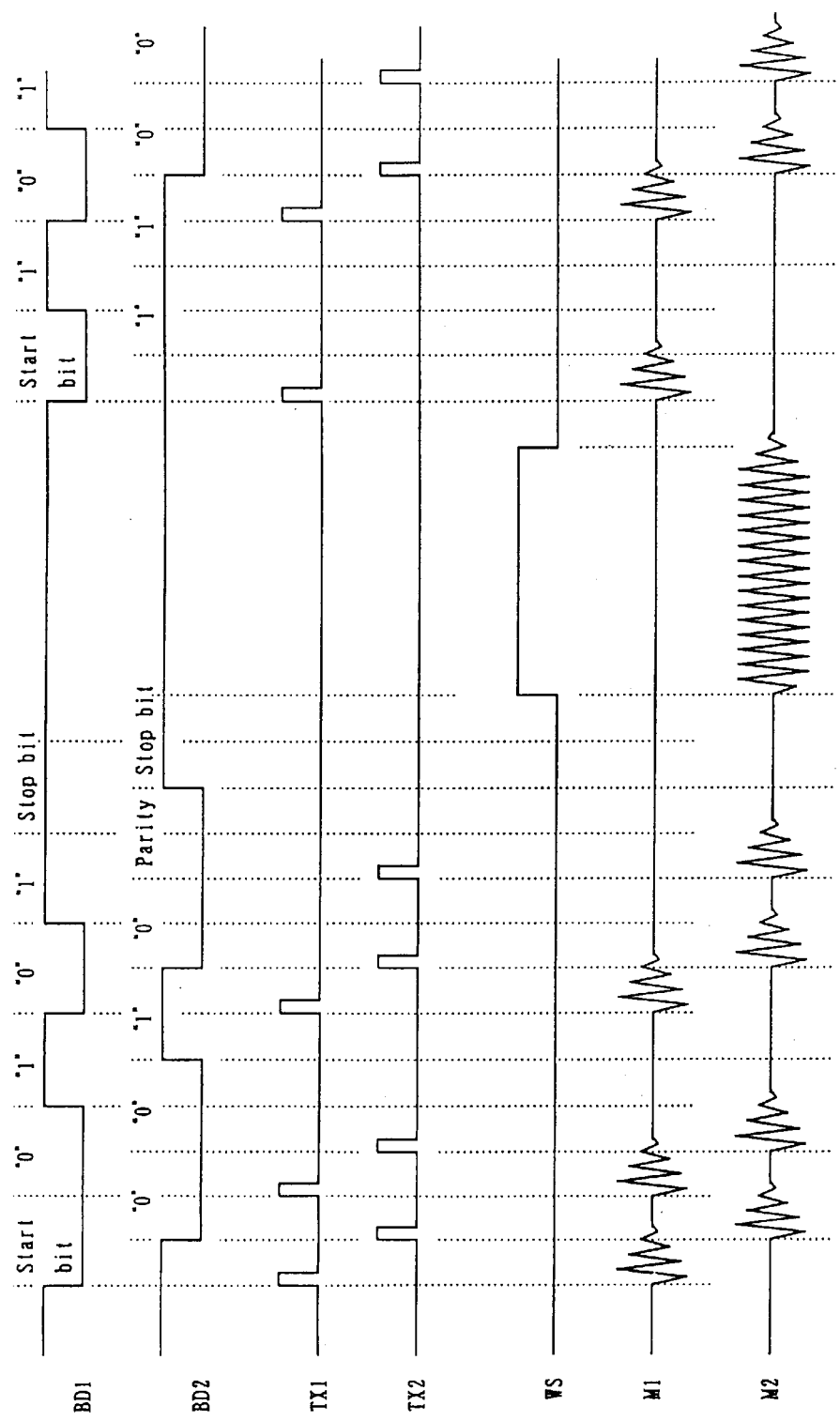
FIG. 5 is a waveform diagram which shows the main communication waveforms in an embodiment of the present invention.
Figure 6:
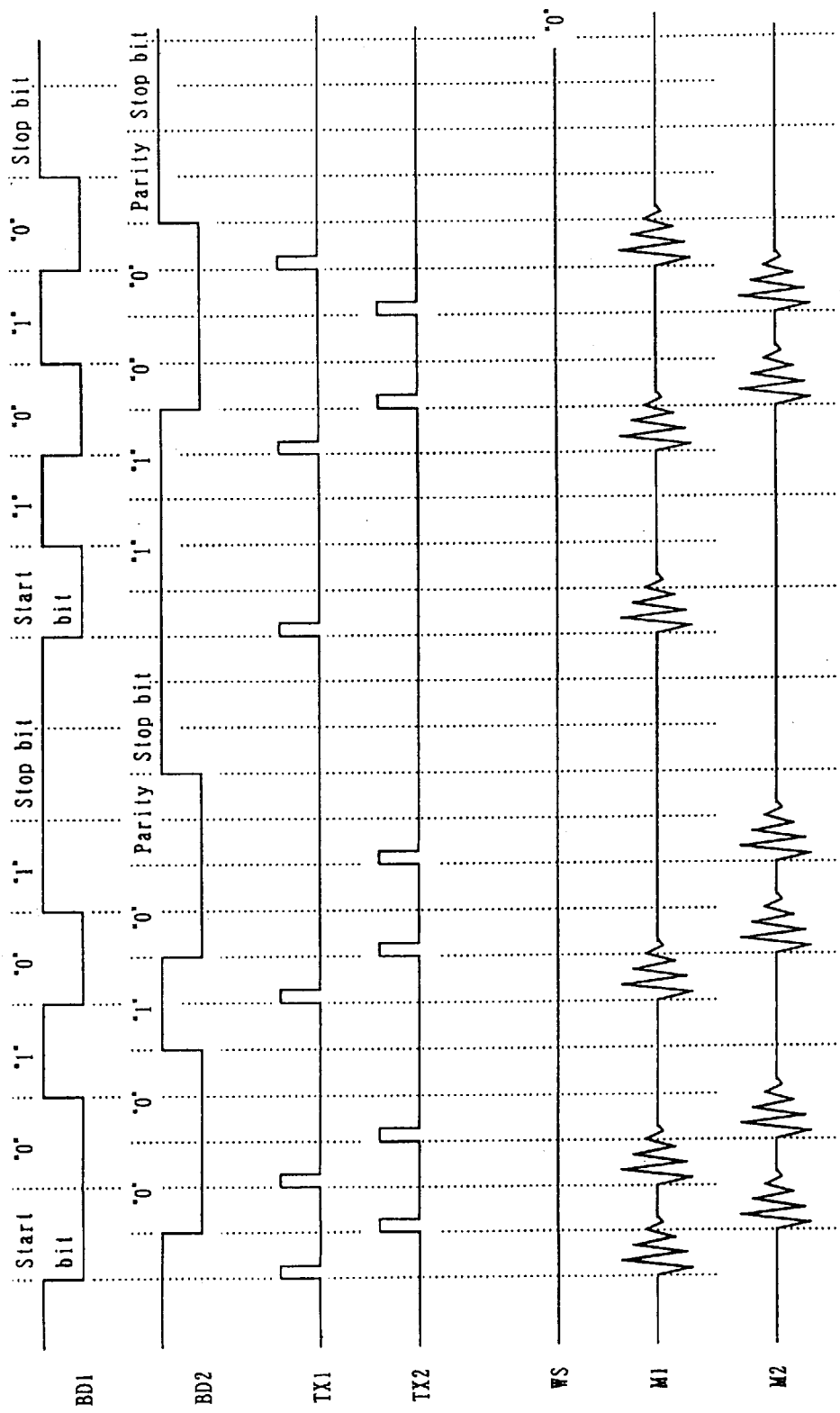
FIG. 6 is a waveform diagram which shows the main communication waveforms in an embodiment of the present invention.

FIG. 5 and FIG. 6 show the condition in which two bytes of data (4Ah and 35h, both hexadecimal) are continuously transmitted to the reader/writer side 20 from the memory card 50 side.

Turning first to FIG. 5, the condition shown is that in which, at the point at which the transmission of the first byte of data shown in the drawing (4Ah) from the memory card side 50 is completed and each group of 4 bits of data are available and received in the first and second data receiving shift registers 29 and 30 of the reader/writer side 20, there exists within the receiving buffer register 31 one byte of previously received data that has not yet been read by the microcomputer 33.

In this condition, because the condition is detected by the receiving control circuit 32 in which already received but not yet passed on data is remaining in both the first and second data receiving shift registers 29 and 30, and the receiving buffer register 31, this receiving control circuit 32 outputs a transmission wait request signal WS to the memory card side 50, this being input to the second transmission modulator circuit 46.

As a result, a transmission carrier signal CS having a prescribed frequency is input to the second transmission driving circuit 48 via the second transmission modulator circuit 46, the second communication antenna 42 being placed in the transmission modulation condition by means of series resonance drive, and an AC waveform of the same frequency as the transmission carrier signal CS appearing in the second electromagnetic interface signal M2.

Additionally, because of induction from the above, the resonance waveform that appears in the second resonant circuit 72 on the memory card 50 side is detected by the second detection circuit 78, so that during the period in which the above-noted transmission wait request signal WS is being output from the receiving control circuit 32, in the reader/writer side 20, the received demodulated signal RX2 output from the second detection circuit 78 on the memory card 50 side is in the 0 condition.

On the memory card 50 side, the receiving control circuit 58 and the transmission control circuit 63 are performing the function controlling the receiving and transmission timing and of forming the operational timing signals, the main control circuit 56 performing overall control of communication and control of addressing for memory access.

In the condition described above, in which subsequent data to be transmitted from the memory card 50 side is remaining, and also in which the transmission of one byte of data has been completed and the first stop bit period has passed, when the period of the second stop bit is entered, in response to a prescribed timing control signal from the transmission control circuit 63, the transmission wait request signal detection circuit 64 checks the received demodulated signal RX2 that is output from the above-noted second detection circuit 78.

At this point, if the received demodulated signal RX2 is detected as being 0, the transmission wait request signal detection circuit 64 treats this as meaning that the transmission wait request signal has been detected as being sent from the reader/writer 20 side via the electromagnetic coupling interface section.

As a result, in accordance with a detection signal from the transmission wait request signal detection circuit 64, the transmission control circuit 63 causes the first and second data transmission shift registers 61 and 62 to wait before sending the next one byte of data.

Thus, on the memory card 50 side, during each interval between transmission of single bytes of serial data to the reader/writer 20 side, part of the stop bit period thereof is utilized to detect the presence or absence of the transmission wait request signal WS sent from the reader/writer side 20 via the electromagnetic coupling interface section.

Should the transmission wait request signal be detected at that time, a period of waiting is entered before sending the next byte of data.

In this condition, when the microcomputer 33 executes the reading of data that is held in the receiving data buffer register 31, while the RXRDY signal which indicates the ability to read data and which is output from the receiving control circuit disappears at first, the already received data in the first and second receiving shift registers 29 and 30 is immediately passed to the receiving data buffer register 31, at which point the RXRDY signal output from the receiving control circuit 32 and which indicates that reading is possible is set, this indicating to the microcomputer 33 that it is possible to read the next received data.

As a result of the above action, even if the next byte of data is transmitted form the memory card 50 side, because the reader/writer side 20 does not experience an overrun error, the receiving control circuit 32 of the reader/writer side 20 stops the output of the transmission wait request signal WS.

As a result, the received demodulated signal RX2 that is output from the second detection circuit 78 at the memory card 50 side goes into the 1 condition, so that when the transmission wait request signal detection circuit 64 detects the cancellation of the transmission wait request signal WS, it removes the transmission wait control applied by the receiving control circuit 63, this resulting in the start of transmission of next one byte of data from the memory card 50 side.

Thus, if a transmission wait request signal is detected at the memory card 50 side, a wait is made before sending the next byte of data, at least until this transmission wait request signal is canceled.

FIG. 6 shows the condition in which, at the point at which the transmission of the first byte of data shown in the drawing (4Ah) from the memory card 50 has been completed, the receiving buffer register 31 is empty, the reading by the microcomputer 33 of the previously received one byte of data having already been completed.

That is, in the above-noted condition, the already received data in the first and second receiving shift registers 29 and 30 is immediately passed to the receiving buffer register 31 and the RXRDY signal that indicates that it is possible to read data is set from the receiving control circuit 32.

In this case, therefore, there is no unpassed received data remaining in the first and second data receiving shift registers 29 and 30, so that even if the next one byte of data is transmitted from the memory card 50, no overrun error occurs, the result being that the output of the transmission wait request signal WS to the memory card 50 is not made by the receiving control circuit 32, the second communication antenna 42 not going into the transmission modulation condition.

In this case, at the timing at which a check is performed by the transmission wait request signal detection circuit 64 of the memory card side 50, because the received demodulated signal RX2 is in the 1 condition, the transmission control circuit 63 does not cause the first and second data transmission shift registers 61 and 62 to wait before sending the next one byte of data, and when the second stop bit period elapses, transmission is made immediately.

In an embodiment of a storage medium system which uses a contactless memory card of the present invention as described above, the memory card 50 can have a configuration that does not include a power supply.

In the above-noted case, the electrical power consumed within the contactless memory card 50 is induced within the contactless memory card side 50 from the reader/writer side 20 via the electromagnetic coupling interface, so that it is necessary to use a system of sending and receiving information that consumes as little power as possible.

For this reason, the transmission of data from a contactless memory card side to a reader/writer side such as in the present invention uses a single-shot signal to send individual bits, one byte of data transmitted from the contactless memory card side being divided into two groups of data, the phase of the single-shot generation for these groups being skewed, thereby avoiding the use of a large amount of electrical at one time.

In a storage medium system that uses a contactless memory card of the present invention as described above, because of the need to minimize the power consumption, the above-noted single-shot method is employed.

Figure 8:
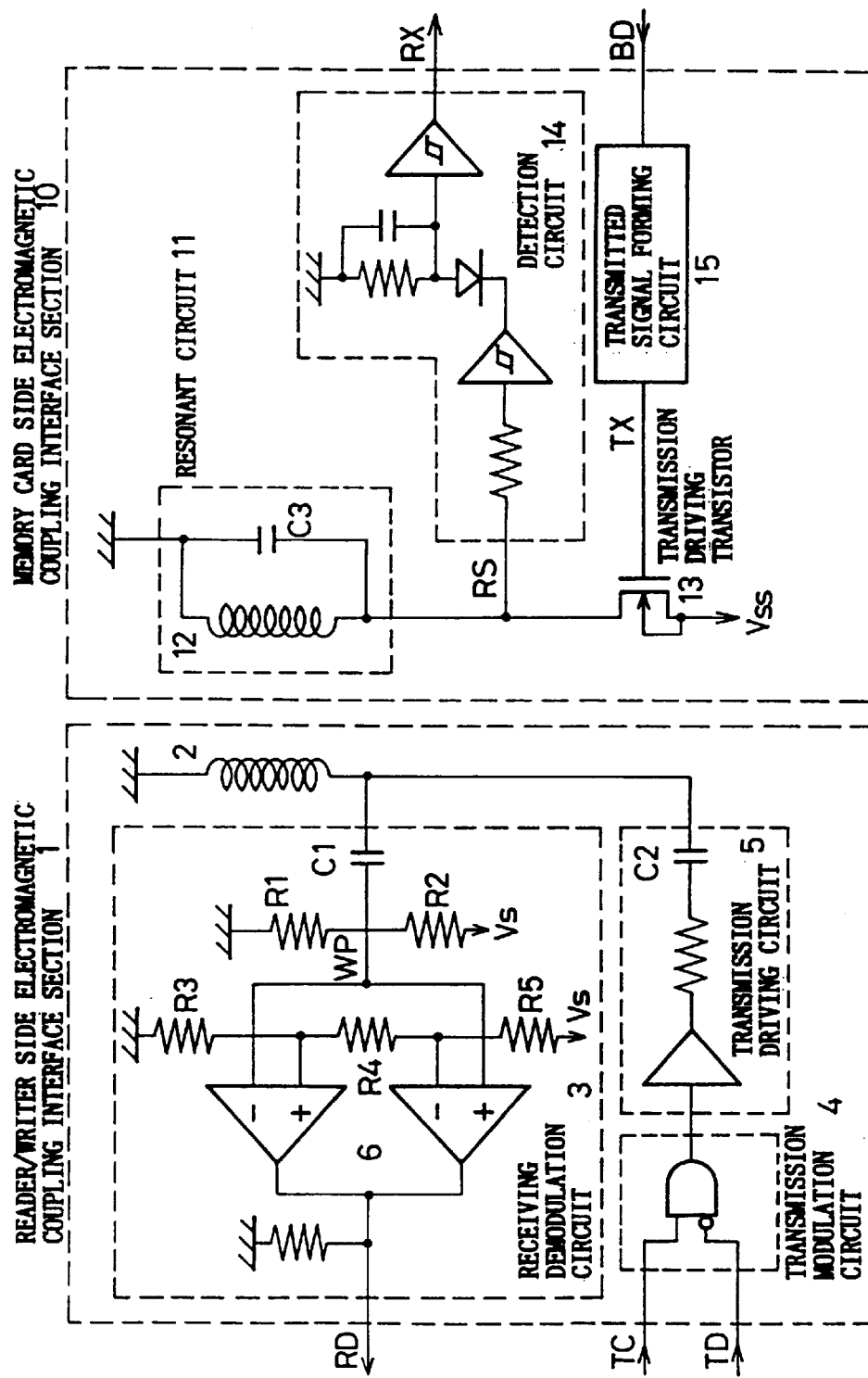
FIG. 8 is a circuit diagram which shows the configuration of the communication circuit in a storage medium system that uses a contactless memory card of the prior art.
Figure 9:
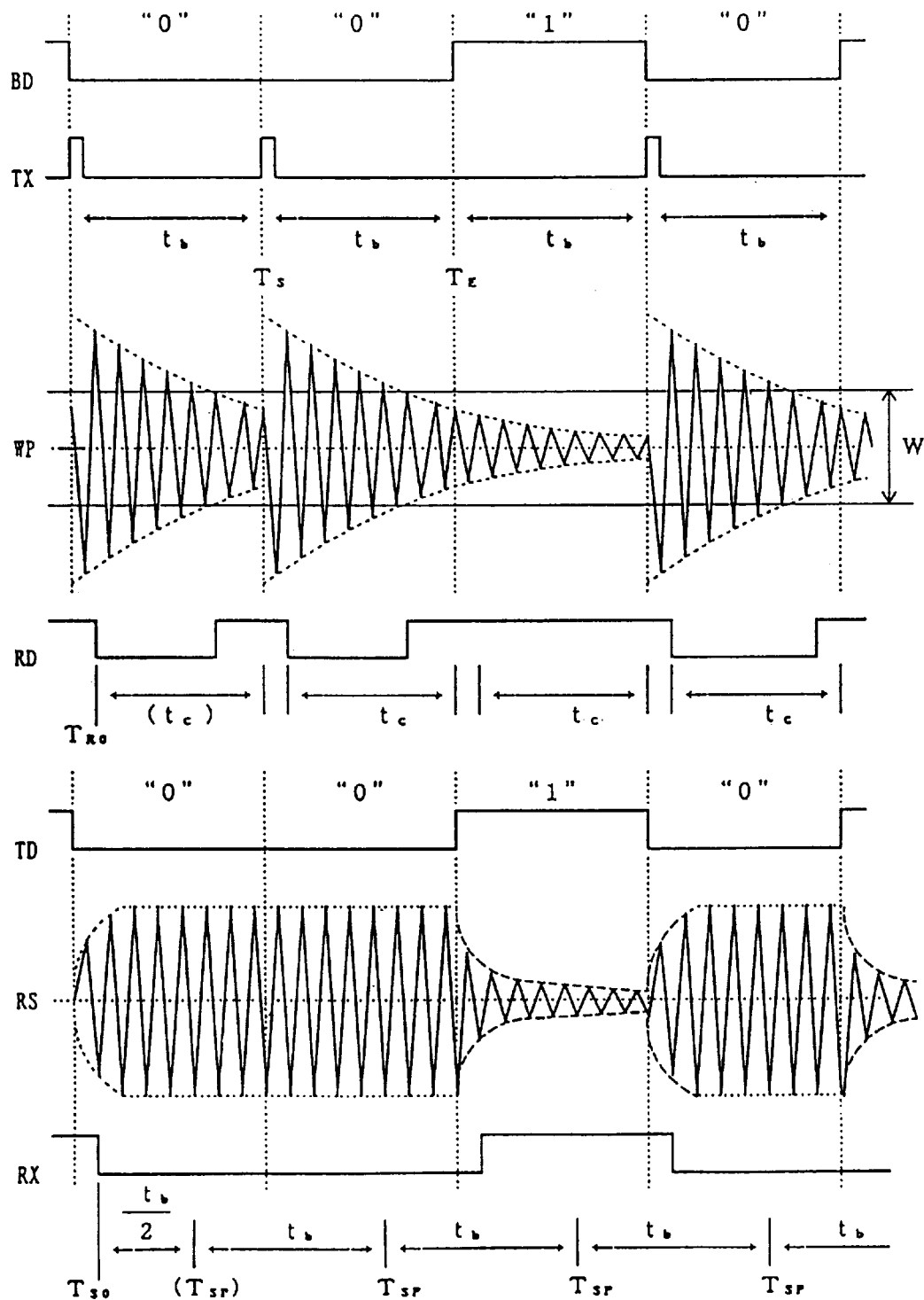
FIG. 9 is a waveform diagram which shows the main communication waveforms in the prior art.

However, this single-shot method is not without its problems. For example, because of the use of a resonant circuit in the electromagnetic coupling interface section, the output waveform exhibits free damping that is characteristic of this resonant circuit, so that there is a lingering of the tail of the signal when performing communication, this representing a problem in terms of achieving communication reliability and high speed, as already discussed with regard to FIG. 8 and FIG. 9, which illustrate the prior art.

With regard to the method of providing a plurality of LC resonant circuits and performing parallel transmission of data so as to achieve a substantial improvement in communication speed, there is a danger that the instantaneous electrical power at the card side will not be sufficient to drive this plurality of resonant circuits.

To solve this drawback in the prior art, another embodiment of the present invention has the following technical constitution.

Specifically, in this storage medium system that uses a contactless memory card and which is formed by a contactless memory card and a card reader/writer that perform the mutual passing of information via respective electromagnetic coupling interface sections that include a coil that serves for both transmitting and receiving by the start-stop synchronized serial data method, the contactless memory card 50 is one that uses an electromagnetic coupling to transmit data via an LC resonant circuit 71 or 72, this card being provided with transmission signal forming circuits 83 and 84 which form a transmission signal by means of a single-shot signal in response to the contents of data to be transmitted, transmission driving circuits (transmission driving transistor) 75 and 76 which drive the above-noted LC resonant circuits, resonance control circuits 79 and 80 which are connected in parallel with the above-noted LC resonant circuits, and control signal forming circuits 65 and 66 which form a control signal having a prescribed phase relationship with respect to the timing of the output of the above-noted transmission signal, control being performed by the above-noted control signal of a switching element (FET 81) of the resonance control circuit 79 and a switching element (not shown in the drawing) of the transmission control signal forming circuit 80, so that the oscillation damping in the above-noted LC resonant circuits 71 and 72 is encouraged.

In this embodiment, it is desirable that the transmission signal forming circuits 83 and 84 which form the transmission signals using a single-shot signal in response to the data to be transmitted, and the transmission driving transistors 75 and 76 which drive the above-noted LC resonant circuits 71 and 72 in response to the above-noted transmission signal be provided for each of the plurality of LC resonant circuits 71 and 72, the above-noted transmission signal forming circuits 83 and 84 forming the above-noted transmission signals having a mutually different timing, so that the drive timings of the above-noted transmission driving circuits are mutually skewed.

In the above-noted embodiment of the present invention, the contactless memory card, which is configured so as to perform data transmission using an electromagnetic coupling via the first and the second LC resonant circuits 71 and 72, transmission signal forming circuits 83 and 84 which form a transmission signal by means of a single-shot signal in response to the contents of data be transmitted, resonance control circuits 79 and 80 which are connected in parallel with the above-noted LC resonant circuits, and control signal forming circuits 65 and 66 which form a control signal having a prescribed phase relationship with respect to the timing of the output of the above-noted transmission signal are provided to both the above-noted first and second LC resonant circuits 71 and 72, control being performed so that the above-noted transmission signal forming circuits 83 and 84 forming the above-noted transmission signals with mutually different timing, so as to skew the drive timing of the above-noted transmission driving circuits (transmission driving transistors) 75 and 76, the above-noted control signal forming circuits 65 and 66 outputting a control signal with a timing that drives at least the other of the LC resonant circuits 71 and 72, this control signal controlling a switching element (FET 81) of the resonance control circuit 79 and a switching element (not shown in the drawing) of the transmission control signal forming circuit 80 so that the oscillation damping in the above-noted LC resonant circuit is encouraged.

That is, as is clear from FIG. 3, in this embodiment of the present invention, the first and second resonance control circuits 79 and 80 are connected respectively to the first and second LC resonant circuits 71 and 72. The first resonance control circuit 79 is substantially implemented by the FET (field effect transistor) 81 as a switching element and the resistor 82, these elements being connected in parallel with the first resonant circuit 71, the relationship with respect to the second resonant circuit 72 an the second resonance control circuit 80 being exactly the same.

Next, the operation of a storage medium system which uses the contactless memory card of this embodiment will be described, with reference being made to FIG. 7.

Specifically, with regard to the transmission of data from the memory card 50 to the reader/writer 20, the memory card 50, as shown in FIG. 1, includes a built-in EEP-ROM non-volatile memory 55, and in response to a control signal from the main control circuit, for example, one byte of data is read by the non-volatile memory 55, this being divided into a lower-order 4 bits and an upper-order 4 bits which are passed respectively to the first and second data transmission shift registers 61 and 62, via the data bus 57.

As a result, in response to a transmission timing signal from the transmission control circuit 63, the upper-order 4 bits of data of the one byte of data in the above-noted first shift register 61 is output as the first serial transmission data BD1 in start-top synchronization, and in the same manner the lower-order 4 bits of data from the second shift register 62 are output as the second serial transmission data BD2.

Additionally, the first and second transmission signal forming circuits 83 and 84, in response to the first and second transmission data BD1 and BD2, form the transmission signals TX1 and TX2 as single-shot signals. As shown in FIG. 7, when each bit of the transmission data BD1 and BD2 is 0, the transmission signals TX1 and TX2 are formed as single-shot signals, thereby driving the first and second transmission driving transistors 75 and 76, respectively, and because the second transmission signal TX2 is output with a delay of a bit time period tb with respect to the first transmission signal TX1, the simultaneous driving of the first and second transmission driving transistors 75 and 76 is avoided.

That is, while it is difficult to impart to the memory card side enough power supply capacity for supplying the power for the electromagnetic coupling, by having the above-noted transmission signal forming circuits 83, 84 form the transmission signals TX1 and TX2 at different timings, as described above, so that the drive timing of the transmission driving transistors 75 and 76 are mutually skewed, it is possible to prevent the situation in which an excessively high instantaneous power consumption causes a drop in the power supply voltage, this resulting in circuit misoperation or the occurrence of a communication error.

The first and the second transmission control signal forming circuits 65 and 66 form the first and second transmission control signals TB1 and TB2, which each have a prescribed phase relationship with respect to the timing of the output of the first and second transmission signals TX1 and TX2, these being supplied to the first and second resonance control circuits 79 and 80.

As a result, the current wave form of the first and second resonant circuits 71 and 72 are driven in response to the transmission signals TX1 and TX2, after which rather than allowing these to merely be freely damped, transmission control signals TB1 and TB2 encourage a sudden damping of the transmission signals TX1 and TX2, by forming a path over which the reverberating energy remaining in the resonant circuits can escape during the period in which the switching element (FET 81) of the first resonance control circuit 79 and the switching element (not shown in the drawing) of the second resonance control circuit 80 are in the on condition, this causing a collapse of the resonance condition.

Figure 7:
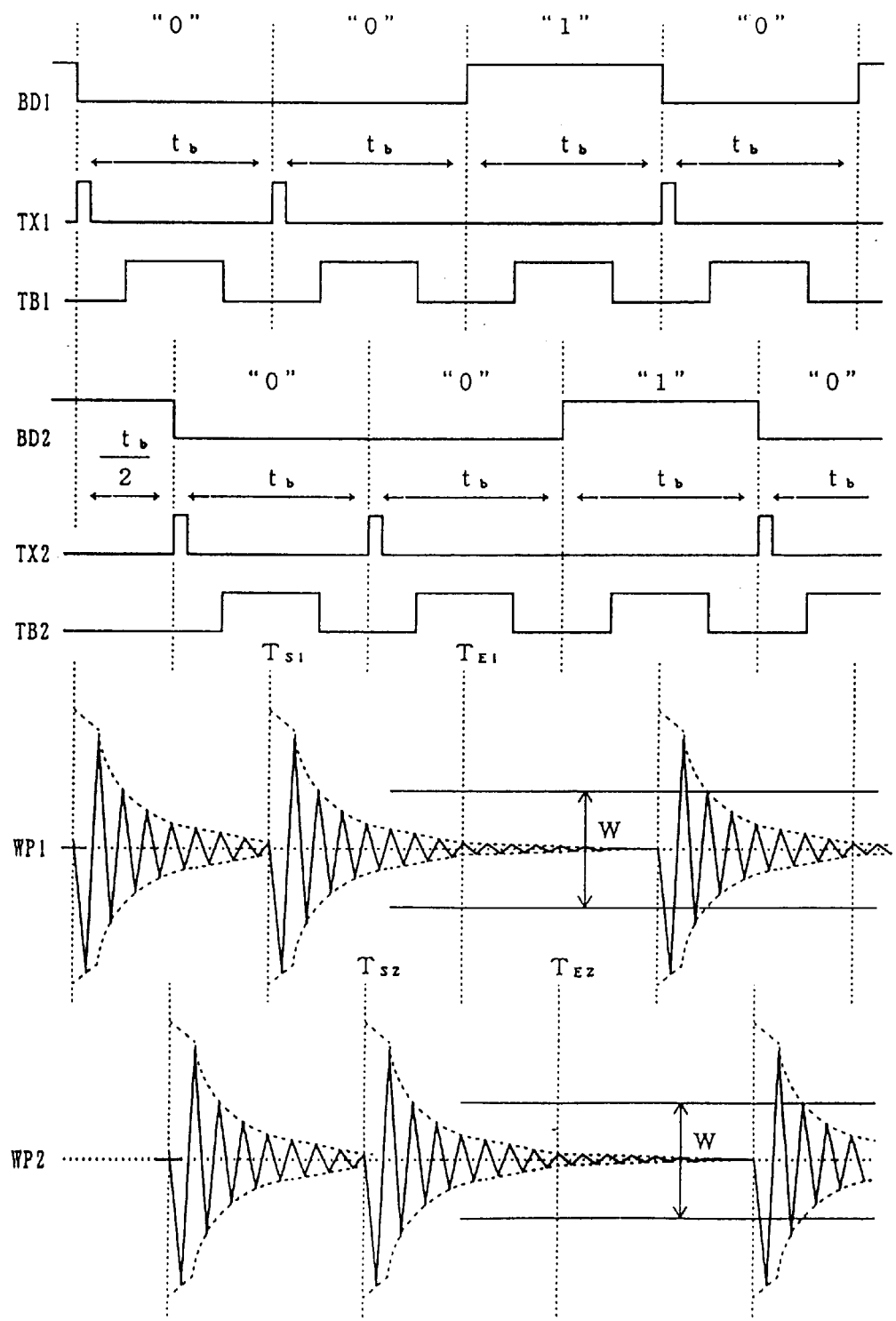
FIG. 7 is a waveform diagram which shows the main communication waveforms in an embodiment of the present invention.

At the first and second communication antennas 41 and 42 of the reader/writer side 20, because there is induced a voltage that corresponds to the current waveform in the antennas of the first and second resonant circuits 71 and 72, the received demodulated signals WP1 and WP2 (that is, the input signals to the window comparator used for receiving demodulation) of the first and second receiving demodulator circuits 43 and 44, as shown in FIG. 7, are also encouraged to suddenly be damped during the time period in which the first and second transmission control signals TB1 and TB2 are output.

As a result, as shown in FIG. 7, even in the case, for example, in which the bit data at times TS1 and TS2 are 0 and the transmission signal output is made, and at times TE1 and TE2 the data are 1 and the transmission signal output is not made, at the point at which the sampling interval is reached, with respect to the times TE1 and TE2, because the amplitude of the received demodulated signals WP1 and WP2 are encouraged to be sufficiently damped there is absolutely no danger that the window width W will be exceeded so as to cause a communication error.

However, the first and second transmission control signal forming circuits 65 and 66, as shown in FIG. 7, at a timing at which the other side's resonant circuit is being single-shot driven, minimally form the transmission control signals TB1 and TB2, so as to apply control to their own side's resonant circuit, the result being that it is possible to make effective use of the time, and also possible to prevent interference between the antennas of the first and second resonant circuits 71 and 72.

That is, if for example because of space limitations the antenna of the first and second resonant circuits 71 and 72 are placed in relatively close proximity, the single-shot drive of one of the antennas has a possibility of imparting interference by means of electromagnetic induction into the other antenna, which would result in an increased risk of the occurrence of a communication error.

However, by virtue of the above-noted configuration, at the time of single-shot drive of one antenna, because the resonance condition in the other antenna is controlled so as to collapse, it is possible to prevent a lowering of the communication reliability caused by mutual interference between a plurality of resonant circuits.

In the memory card 50, with regard to the pulse widths of the transmission signals TX1 and TX2 which drive each of the LC resonant circuits 71 and 72, it is appropriate to establish the pulse with as being ⅛ of the bit time width or smaller, there merely being an increase in the consumption of power at a larger width than this, with no accompanying effective communication signal component.

That is, it is clear that the size of the effective communication signal component is directly proportional to the instantaneous change of current flowing in the resonant circuit (value of the derivative of the current), and when the pulse widths of the transmission signals TX1 and TX2 are made large, there is a danger that the current that flows through the parallel-resonant antenna, will pass beyond the transient (changing) region so as to approach the saturation (steady-state) region.

With regard to the time widths of the transmission control signals TB1 and TB2, to make effective use of control, it is necessary that this be established as ¼ of the bit width or greater, and preferable that the maximum not exceed ⅝ thereof, because it is desirable that there be a minute time width shift with respect to the timing of the output of the transmission signals TX1 and TX2.

At the reader/writer 20, a window comparator is used for receiving demodulation, the configuration being such that the deflection above and below the amplitude center with respect to the received demodulated signal is detected. However, it is also possible to perform detection by a single-ended comparator that detects the deflection in only one direction with respect to the amplitude center.

When the bit data of the above-noted serial transmission data TD1 and TD2 are 0, a transmission carrier signal CS having a prescribed frequency is input to the first and second transmission driving circuits 47 and 48, respectively, via the first and second transmission modulator circuits 45 and 46.

That is, the first and second transmission modulator circuits 45 and 46 perform so-called inverted ASK of the transmission carrier signal CS by means of the serial transmission data TD1 and TD2, the first and second communication antennas 41 and 42 being series driven when the serial transmission data TD1 and TD2 are 0, this causing induction by which the resonance waveforms RS1 and RS2 appear also in the first and second resonant circuits 71 and 72 of at the memory card 50 side.

The resonance waveforms RS1 and RS2 are each input to and detected by the first and second detection circuits 77 and 78, and basically when the first and second communication antennas 41 and 42 are driving by the above-noted transmission carrier signal the received demodulated signals RX1 and RX2 that are output from the detection circuits 77 and 78 are in the 0 condition.

The received demodulated signals RX1 and RX2 are taken into the first and second data receiving shift registers 59 and 60 one bit at a time as serial data, for each prescribed sampling timing, this having as a phase reference point the point at which the start bit of the received demodulated signal RX1 is detected, based on the timing control function included in the receiving control circuit 58.

The first and second receiving shift registers 59 and 60 are provided as data receiving circuits for the purpose of serial-to-parallel conversion, the above-noted received demodulated signals RX1 and RX2 being taken into these first and second receiving shift registers 59 and 60 and, after each completion of division thereof into an upper-order 4 bits and a lower-order 4 bits, these are passed, for example, to the non-volatile memory 55, via the data bus 57.

The receiving control circuit 58 and the transmission control circuit 63 perform control of the receiving and transmission sequence, respectively, and serve to form operational timing signals, the main control circuit 56 performing overall control of the communication sequence and control of addressing for memory access.

In the above-described embodiment of the present invention, the first and second resonance control circuits 79 and 80 is formed by the series connected circuit of an FET as a switching element and a resistor, the drain electrode of the FET being connected to one end of the resistor, and the other end of the resistor being connected to the parallel LC resonant circuit, the above-noted intervening resistor being provided to prevent clamping of the resonant circuit signal to the level of the source side of the FET.

Therefore, in the case of using an analog switch that does not have a diode action as the switching element of the resonant circuit, it is not necessary to have the above-noted resistor.

Additionally, when using a series circuit formed by and FET and a resistor, when the switching element is in the on condition, by using the resonance control circuit itself as a path for the escape of energy remaining in the resonant circuit amplitude damping of the reverberation is encouraged, and it is also possible, in place of the FET and resistor, to use a series circuit of an FET or the like with a capacitor to form the resonant circuit.

In the above-noted case, according to the condition of the switching element, the capacitance of the capacitor of the resonance control circuit is added to the capacitance of the capacitor of the resonant circuit itself, or removed therefrom, thereby greatly changing the resonant frequency and encouraging the damping of the remaining oscillations therein, so that control is applied when the switching element is in one of the two conditions of on and off.

In the above-described embodiment of the present invention, although an LC resonant circuit is used as the resonant circuit, it is also possible to apply the present invention to the case in which a series LC resonant circuit is used.

Additionally, in this example of the present invention, it is preferable in a memory card that uses a contactless memory card and which is configured so as to perform data transmission via an electromagnetic coupling using a plurality of the above-noted LC resonant circuits, that the transmission signal forming circuit that forms the single-shot transmission signal and the transmission driving circuit that drives the above-noted LC resonant circuits in response to the above-noted transmission signal be provided in each of LC resonant circuit of the plurality thereof, each transmission signal forming circuit forming a transmission signal having mutually different timing, so that the drive timing of the above-noted transmission driving circuits is skewed.

In the above-noted example of the present invention, in a contactless memory card that is configured so as to perform data transmission via an electromagnetic coupling using a first and a second LC resonant circuit, it is possible to provide a transmission signal forming circuit that forms a single-shot single in accordance with the contents of data to be transmitted, a transmission driving circuit that drives the above-noted LC resonant circuits in response to this transmission signal, a resonance control circuit that is connected in parallel with the above-noted LC resonant circuit, and a control signal forming circuit that forms a control signal having a prescribed phase with respect to the timing of the output of the above-noted transmission signal at both the first and second LC resonant circuits, each of the above-noted transmission signal forming circuits forming transmission signals having mutually different timing, so that the drive timings of the transmission driving circuits are skewed, and the control signal forming circuits minimally outputting a control signal at the timing of the driving of the other side's LC resonant circuit, the above-noted control signal controlling the switching element of the above-noted resonance control circuit so as to encourage the damping of the amplitude of oscillations in the above-noted LC resonant circuit.

In the present invention, it is preferable that the LC resonant circuit be a parallel resonant circuit, and that the pulse width of the transmission signal be ⅛ the width of the bit time width or smaller, and also that the pulse width of the resonance control circuit signal be from ¼ to ⅝ the bit time width.

The resonance control circuit can use a series circuit of an FET switching element and a capacitor, and this FET can be a bipolar transistor.

In the present invention configured as described above, in the case in which a plurality of data bytes is sent from the memory card 50 side to the reader/writer 20, even if the host microcomputer read-in of data received at the reader/writer is excessively slow, before an overrun error occurs, an automatic wait is made before the transmission of the next data from the memory card 50.

As a result, in the present invention even without adding a special electromagnetic coupling interface for the purpose of handshaking, under the premise of using the reader/writer in combination with a host microcomputer having a relatively slow operating speed, or use in an application in which there is the possibility of interrupt processing being done during the receiving of data from the memory card, it is possible to achieve sufficiently fast communication speed between the reader/writer and the memory card.

Thus, in the present invention, in the case of use in combination with a microcomputer having a fast operating speed as a host, it is possible to make sufficient use of high-speed communication, and when used in combination with a microcomputer having a slow operating speed, or in an application in which interrupt processing can occur, it is possible to implement a contactless memory card system that does not experience overrun errors, and to provide a contactless memory card system with different communication speed depending upon the type of microcomputer and application to be used, and also it is not necessary to provide a large-capacity buffer memory for the purpose of temporarily reading a large amount of received data within the reader/writer.

In the above-described embodiment of the present invention, the electromagnetic coupling interface section is formed by a first and second electromagnetic coupling interface section for the purpose of performing the dividing and passing of 1-byte units of data, with the first electromagnetic coupling interface section including a stop bit transmission function that operates when the start-stop synchronized serial data is sent from the reader/writer 20 to the memory card 50, according to this configuration, because it is not possible for the second electromagnetic coupling interface section to misinterpret the existence of a transmission wait request signal sent from the reader/writer 20 as a start bit of serial data from the reader/writer 20, it is possible to avoid complexity in the configuration for the purpose of controlling the communication sequence and the like.

In contrast to this, in a configuration in which the sending of the start bit and the sending of the transmission wait request signal during serial communication are performed at one and the same electromagnetic coupling interface section, to ensure that there is no confusion between the two so as to disturb the communication sequence, it is necessary to provide a sequential control circuit having sufficiently sophisticated functions at both the reader/writer 20 side and the memory card 50 side.

In the present invention, in a period after the normally required communication timing, the damping of oscillations in the resonant circuit is encouraged, so that the adverse effect of extraneous reverberation therein on communication is eliminated, the result being that it is possible to increase the speed of communication without sacrificing the reliability of communication, and also possible to improve the reliability of communication at a given speed.

According to the present invention, even in the case in which a plurality of resonant circuits are used, it is possible to avoid a concentration of electrical power consumption when transmitting, so that the danger of losing reliability in circuit operation or communication is prevented.

Furthermore, according to the present invention, even in the case in which a plurality of resonant circuits is used, it is possible while making effective use of time to prevent not only the adverse effect of excessive remaining reverberation therein on communication, but also the adverse effect on communication of mutual interference between these resonant circuits, thereby enabling an increase in communication speed with enhanced reliability and security.

What is claimed is:

1. A storage medium system which uses a contactless memory card and a card reader/writer that perform transfer of information that is start-stop synchronized serial data via electromagnetic coupling interface sections which include respective coils that serve for both transmitting and receiving, said reader/writer comprising:

a data receiving circuit that receives said data sent from the memory card side via said electromagnetic coupling interface section and converts said data to parallel data;

a received data buffer that receives and stores already-received parallel data that had been passed by said data receiving circuit;

a receiving control circuit which, in a condition in which there is already-received data remaining in both said data receiving circuit and said received data buffer, outputs a transmission wait request signal to said memory card; and a transmitting modulation circuit which receives said transmission wait request signal and controls said electromagnetic coupling interface section so as to be in a prescribed transmission modulation condition.

2. A storage medium system that uses a contactless memory card and a card reader/writer that perform transfer of information that is start-stop synchronized serial data via electromagnetic coupling interface sections which include respective coils that serve for both transmitting and receiving, said memory card side comprising:

a data transmitting circuit that sends start-stop synchronized serial data to said reader/writer via said electromagnetic coupling interface section;

means for detecting, during an interval between each transmission of said start-stop synchronized serial data, the presence or lack of a transmission wait request signal sent from said reader/writer through said electromagnetic coupling interface section; and a transmitting control circuit which, when once said detecting means detects said transmission wait request signal, causes said data transmitting circuit to wait to transfer the next data to said data transmitting circuit, at least until said transmission wait request signal is cleared.

3. A storage medium system that uses a contactless memory card and a card reader/writer that perform transfer of information that is start-stop synchronized serial data via electromagnetic coupling interface section which include respective coils that serve for both transmitting and receiving, said reader/writer side comprising:

a data receiving circuit that receives said data sent from said memory card side via said electromagnetic coupling interface section and converts said data to parallel data;

a received data buffer which receives and stores already-received parallel data in a prescribed bit units, that has been passed by said data receiving circuit;

a receiving control circuit which, in a condition in which there is already-received data that has yet to be passed remaining in both said data receiving circuit and said received data buffer, outputs a transmission wait request signal to said memory card; and a transmission modulation circuit which receives said transmission wait request signal and controls said electromagnetic coupling section as to be in a prescribed transmission modulation condition, and said memory card side comprising:

a data transmitting circuit that transmits start-stop synchronized serial data via said electromagnetic coupling interface section in prescribed bit units to said reader/writer;

means for detecting, during an interval between each transmission of said start-stop synchronized serial data in prescribed bit units, the presence or lack of said transmission wait request signal sent from said reader/writer through said electromagnetic coupling interface section; and a transmitting control circuit which, when once said detecting means detects said transmission wait request signal, causes said data transmitting circuit to wait to transfer the next data to said data transmitting circuit, at least until said transmission wait signal is cleared.

4. A storage medium system that uses a contactless memory card according to claim 3, wherein said electromagnetic coupling interface section comprises a first electromagnetic coupling interface section and a second electromagnetic coupling interface section.

5. A storage medium system that uses a contactless memory card according to claim 4, wherein said data receiving circuit on said reader/writer side comprises a first data receiving circuit and a second data receiving circuit and wherein said data transmitting circuit of said memory card side comprises a first data transmitting circuit and a second data transmitting circuit.

6. A storage medium system that uses a contactless memory card according to claim 5, wherein said data in prescribed bit units is divided into a first data group and a second data group, said first and second data groups being separately communicated via said first and second electromagnetic coupling interface sections, respectively.

7. A storage medium system that uses a contactless memory card according to claim 6, wherein said first data group includes a start bit and a stop bit, and said second data group includes a parity bit and a stop bit, and further wherein said reader/writer side is configured so as to send a transmission wait request signal to said memory card via said second electromagnetic coupling interface section.

8. A storage medium system that uses a contactless memory card according to claim 3, wherein said electromagnetic coupling interface section comprises a first electromagnetic coupling interface section and a second electromagnetic coupling interface section for the purpose of dividing said data with a prescribed bit units into two groups and transmitting and receiving thereof, and further wherein said first electromagnetic coupling interface section includes a function of sending a start bit when start-stop synchronized serial data is transmitted from said reader/writer to said memory card, and wherein said second electromagnetic coupling interface section includes a function of sending a transmission wait request signal from said reader/writer to said memory card.

9. A storage medium system that uses a contactless memory card and a card reader/writer that perform transfer of information that is start-stop synchronized serial data via an electromagnetic coupling interface sections which includes respective coils that serve both for transmitting and receiving, said memory card side comprising:

an antenna of said electromagnetic coupling interface section that is an LC resonant circuit;

a transmitted signal forming circuit which forms a transmitted signal by means of a single-shot signal in response to the contents of said data to be transmitted;

a transmission driving circuit which drives said LC resonant circuit in response to said transmitted signal;

a resonance control circuit which is connected in parallel with said LC resonant circuit; and a control signal forming circuit which forms a control signal having a prescribed phase relationship with respect to the timing of the output of said transmitted signal, said control signal controlling a switching element that is part of said resonance control circuit so as to promote attenuation of oscillation in said LC resonant circuit.

10. A storage medium system that uses a contactless memory card and a card reader/writer that perform transfer of information that is start-stop synchronized serial data via electromagnetic coupling interface sections which include respective coils that serve both for transmitting and receiving, said electromagnetic coupling interface section comprising a plurality of electromagnetic coupling interface sections, an antenna of each of said plurality of electromagnetic coupling interface sections in said memory card side being an LC resonant circuit, and said memory card side comprising:

a transmitted signal forming circuit which forms a transmitted signal by means of a single-shot signal in response to the contents of said data to be transmitted and a transmission driving circuit which drives said LC resonant circuit in response to said transmitted signal, said transmitted signal forming circuit and said transmission driving circuit being provide for each LC resonant circuit of said plurality of LC resonant circuits, and wherein each transmitted signal forming circuit forms said transmitted signals with mutually different timing, so that the timings of the driving of each said transmission driving circuit are mutually skewed.

11. A storage medium system that uses a contactless memory card and a card reader/writer that perform transfer of information that is start-stop synchronized serial data via an electromagnetic coupling interface sections which includes respective coils that serve both for transmitting and receiving, said electromagnetic coupling interface section comprising a first electromagnetic coupling interface section and a second electromagnetic coupling interface section, wherein at said memory card side an antenna of each of said first and second electromagnetic coupling interface sections is an LC resonant circuit in said memory card side, and further wherein said memory card side comprising:

- a transmitted signal forming circuit which forms a transmitted signal by means of a single-shot signal in response to the contents of said data to be transmitted;
- a transmission driving circuit which drives said LC resonant circuit in response to said transmitted signal;
- a resonance control circuit which is connected in parallel to said LC resonant circuit; and
- a control signal forming circuit which forms a control signal having a prescribed phase relationship with respect to the timing of the output of said transmitted signal, said transmitted signal forming circuit, said transmission driving circuit, said resonance control circuit, and said transmission circuit being provided for both said first and second LC resonant circuits, so that each of the data transmitted signal forming circuit forming said transmission signal with a different timing from each other whereby the drive timing of each transmission driving circuit is mutually skewed, each of said control signal forming circuit minimally outputting a control signal with a timing at least when the other side's LC resonant circuit is driven, said control signal controlling a switching element of said resonance control circuit so that attenuation of oscillations in said LC resonant circuit is promoted.

12. A storage medium system that uses a contactless memory card according to claim 11, wherein said resonance control circuit is formed by a series circuit of an FET provided as a switching element and a resistance.

13. A storage medium system that uses a contactless memory card according to claim 11, wherein said LC resonant circuit is a parallel resonant circuit, and wherein the transmitted signal pulse width is $\frac{1}{8}$ of a bit time width or less and further wherein the resonance control signal pulse width is between $\frac{1}{4}$ and $\frac{5}{8}$ of the bit time width.

* * * * *

UNITED STATES PATENT AND TRADEMARK OFFICE
CERTIFICATE OF CORRECTION

| | |
|---|---|
| PATENT NO. | : 6,088,741 |
| APPLICATION NO. | : 08/981785 |
| DATED | : July 11, 2000 |
| INVENTOR(S) | : Murata |

It is certified that error appears in the above-identified patent and that said Letters Patent is hereby corrected as shown below:

In claim 2, column 21, line 4, delete "data transmitting circuit" and insert --reader/writer--.

In claim 3, column 21, lines 43-44, delete "data transmitting circuit" and insert --reader/writer--.

In claim 11, column 23, line 24 delete "transmission" and insert --control signal forming--.

Signed and Sealed this

Twenty-fourth Day of July, 2007

JON W. DUDAS
*Director of the United States Patent and Trademark Office*